United States Patent [19]
Adenot et al.

[11] Patent Number: 6,003,800
[45] Date of Patent: Dec. 21, 1999

[54] FISHING REEL PROVIDED WITH A SOUND MECHANISM

[75] Inventors: Lionel Adenot, Marcq en Baroeul; Alexandre Garcia De Souza Ventura, Roubaix, both of France

[73] Assignee: Decathlon, Villeneuve D'Ascq, France

[21] Appl. No.: 09/039,918

[22] Filed: Mar. 16, 1998

[30] Foreign Application Priority Data

Mar. 18, 1997 [FR] France ................................. 97 03504

[51] Int. Cl.⁶ ............................................... A01K 89/00
[52] U.S. Cl. ........................... 242/306; 242/308; 242/322
[58] Field of Search ................................... 242/245, 283, 242/286, 296, 306, 308, 322

[56] References Cited

U.S. PATENT DOCUMENTS

| | | |
|---|---|---|
| 2,059,765 | 11/1936 | Adams . |
| 2,457,323 | 12/1948 | Sharps . |
| 2,989,266 | 6/1961 | Yeada ................................. 242/306 X |
| 3,241,788 | 3/1966 | Visockis ............................. 242/306 X |
| 3,630,166 | 12/1971 | Riddle et al. . |
| 3,741,493 | 6/1973 | Jones ................................... 242/296 |
| 4,688,740 | 8/1987 | Weeks et al. . |
| 5,577,678 | 11/1996 | Murayama ............................ 242/283 |

FOREIGN PATENT DOCUMENTS

| | | |
|---|---|---|
| 3543819 C1 | 5/1987 | Germany . |
| 2096442 | 10/1982 | United Kingdom ................... 242/296 |

*Primary Examiner*—Donald P. Walsh
*Assistant Examiner*—Emmanuel M. Marcelo
*Attorney, Agent, or Firm*—Wolf, Greenfield & Sacks, P.C.

[57] ABSTRACT

The fishing reel comprises a spool for winding in fishing line and a fixed support having an axis of rotation for said spool. The fixed support comprises an upright which is in the immediate vicinity of and parallel to one of the lateral cheekplates of the spool; projecting studs are disposed on the inside face of the upright in a radial distribution around the axis of rotation; the lateral cheekplate of the spool facing the upright includes a recessed annular portion serving to house the studs. One or more radially-extending blades are formed in the cheekplate and project into the recessed annular portion so that on rotation of the spool, each blade emits a characteristic clicking noise when its free end is raised by passing over a stud and falls back against the upright of the fixed support.

20 Claims, 2 Drawing Sheets

FISHING REEL PROVIDED WITH A SOUND MECHANISM

The present invention relates to a fishing reel, in particular for fly fishing, and including a sound mechanism for alerting the fisher when the line is unwinding, being drawn by a fish caught on the hook.

BACKGROUND OF THE INVENTION

A sound mechanism for a fishing reel is known, in particular from document FR A 2 383 604, comprising firstly teeth that are stationary relative to the axis of the spool of the reel and secondly a pawl which engages said teeth to make the desired clicking noise. The problem which that prior document sets out to solve is to release the sound-generating pawl when the fisher mistakenly turns the spool in the direction opposite to normal unwinding of the line when drawn by a fish. This reverse rotation of the spool can damage the pawl and modify the clear sound it generates. To solve that problem, document FR A 2 383 604 proposes a pawl comprising a long strip of curved resilient material having an angled extension, said strip being elastically urged against the cylindrical wall in such a manner as to cause a portion of the strip to expand when the spool rotates in the normal unwinding direction, thereby pressing the sound-generating end against the teeth, whereas during rotation in the opposite direction, the strip is retracted, which has the effect of lifting the sound-generating end away from the stationary teeth.

That sound mechanism is indeed highly effective, however it requires a pawl to be made that is particularly complex in structure, and it also requires a toothed wheel, with those two parts being difficult to assemble relative to the reel assembly.

OBJECT AND SUMMARY OF THE INVENTION

The object of the Applicant is to propose a reel provided with a sound mechanism which is much simpler.

This object is fully achieved by the fishing reel of the invention, in particular a reel for fly fishing, which in conventional manner comprises a spool for winding in the line and a fixed support having a shaft on which said spool rotates.

In characteristic manner, the fixed support comprises an upright which is in the immediate proximity of and parallel to one of the side cheekplates of the spool; in addition the reel includes projecting studs disposed on the inside face of the upright of the support and disposed radially about the axis of rotation; in addition the side cheekplate of the spool facing the upright of the fixed support includes a recessed annular portion acting as a housing for the studs; finally the reel includes one or more radially disposed blades on the cheekplate of the spool projecting into the recessed annular portion so that during rotation of the spool each blade emits a characteristic clicking noise when its free end is raised by passing over a stud and falls back onto the upright of the fixed support.

Thus, in the particular configuration of the invention, the projecting studs form an integral portion of the inside face of the fixed support, which is preferably a piece of molded plastics material.

Advantageously, the reel has two diametrically opposite blades and thirty-six regularly distributed studs occupying 10° angular portions. This preferred version gives the most appropriate clicking noise for fly fishing.

Preferably, in order to avoid the risk of the blades breaking, the studs are in the form of rectangular blocks having sharp edges, and each blade has at least its leading edge rounded.

It will be understood that when a blade passes over a projecting stud with the blade being pushed away towards the inside of the cheekplate by the stud, it is necessary for the structure of the cheekplate to leave clearance to accommodate such displacement behind the blade. Preferably, the blade is inserted in a recessed portion of the cheekplate and inside ridges on the inside face of the cheekplate are disposed on either side of said hollowed out portion. This particular disposition is implemented because, while the line is being wound onto the spool, the line bears against the face of the cheekplate opposite from the studs and can, so to speak, close up the recessed portion of the cheekplate, thereby impeding optimum blade retraction. The presence of inside ridges on this face of the cheekplate makes it possible to deflect the normal path of the line and to define a space in which the blade can retract freely each time it passes over a stud.

In a particularly simplified embodiment of the reel of the invention, the spool is molded out of plastics material and each blade is the result of forming a cutout in the cheekplate corresponding to said molded spool.

Advantageously, a reel of the invention of particularly simplified structure includes a spool made as a single molded piece, a support likewise made as a single molded piece with a snap-fastening system for securing the axis of rotation of the support to the spool, and finally a handle-forming device fixed thereto to enable the spool to be rotated.

In which case, the spool advantageously includes a hollow cylindrical stud on the outside face of its second cheekplate and the handle-forming device is made up of three elements: namely a handle proper with a through bore, a through screw, and a locking insert suitable for being received in the cylindrical stud of the spool and for expanding when the screw is inserted and screwed therein.

In reels for fly fishing, in particular in the reel described in prior document FR A 2 383 604, a drag mechanism is also provided to generate resistance against rotation of the spool. In that document, the drag mechanism is made up of a blade spring and a plurality of plates organized in layers, with half of the plates being non-rotary relative to the spool and the other half being non-rotary relative to the rotary axis of the fixed support; and adjustment knob serves to apply greater friction resistance by compressing the blade spring against the plates.

In the reel of the present invention, the object of the Applicant is to create resistance to rotation of the spool by implementing means that are simplified compared with the traditional drag mechanism.

This object is fully achieved in the reel of the invention in which the position of the spool on the axis of rotation of the fixed support is locked so that the inside face of the upright of the fixed support and the outside face of the lateral cheekplate of the spool, which face each other, are pressed, at least in part, one against the other in frictional manner during rotation of the spool.

Thus the desired effect is obtained solely by the friction between the contacting portions of the face of the upright on the fixed support and the face of the lateral cheekplate of the spool.

BRIEF DESCRIPTION OF THE DRAWINGS

The present invention will be better understood on reading the following description of a preferred embodiment of a fishing reel, in particular a reel for fly fishing, provided with a sound mechanism having studs and blades that are integrated in the molded portions of the reel, and shown in the accompanying drawings, in which.

MORE DETAILED DESCRIPTION

Figure 1:
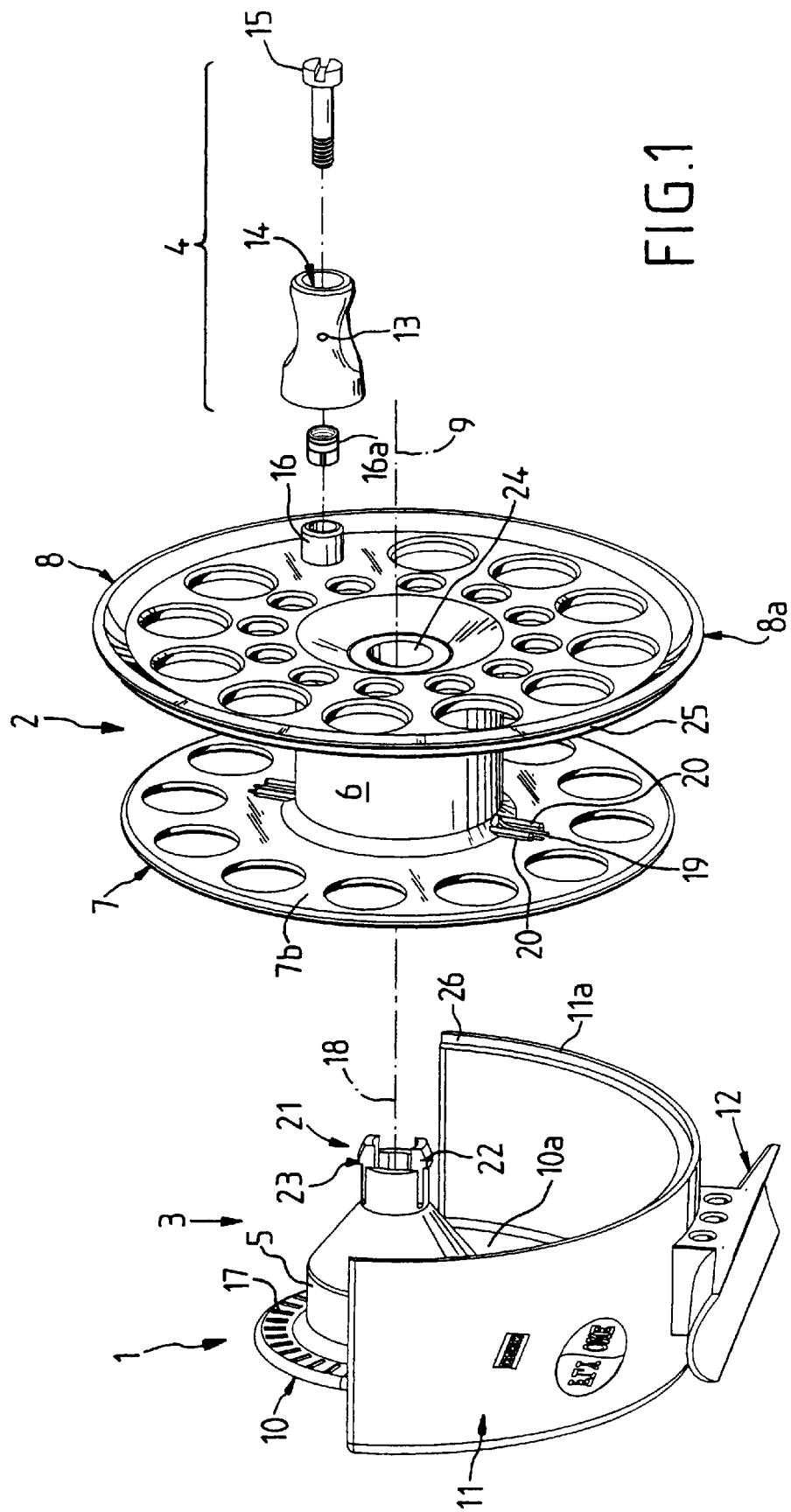
FIGS. 1 and 2 are perspective views of various parts constituting the reel, shown at different angles.
Figure 2:
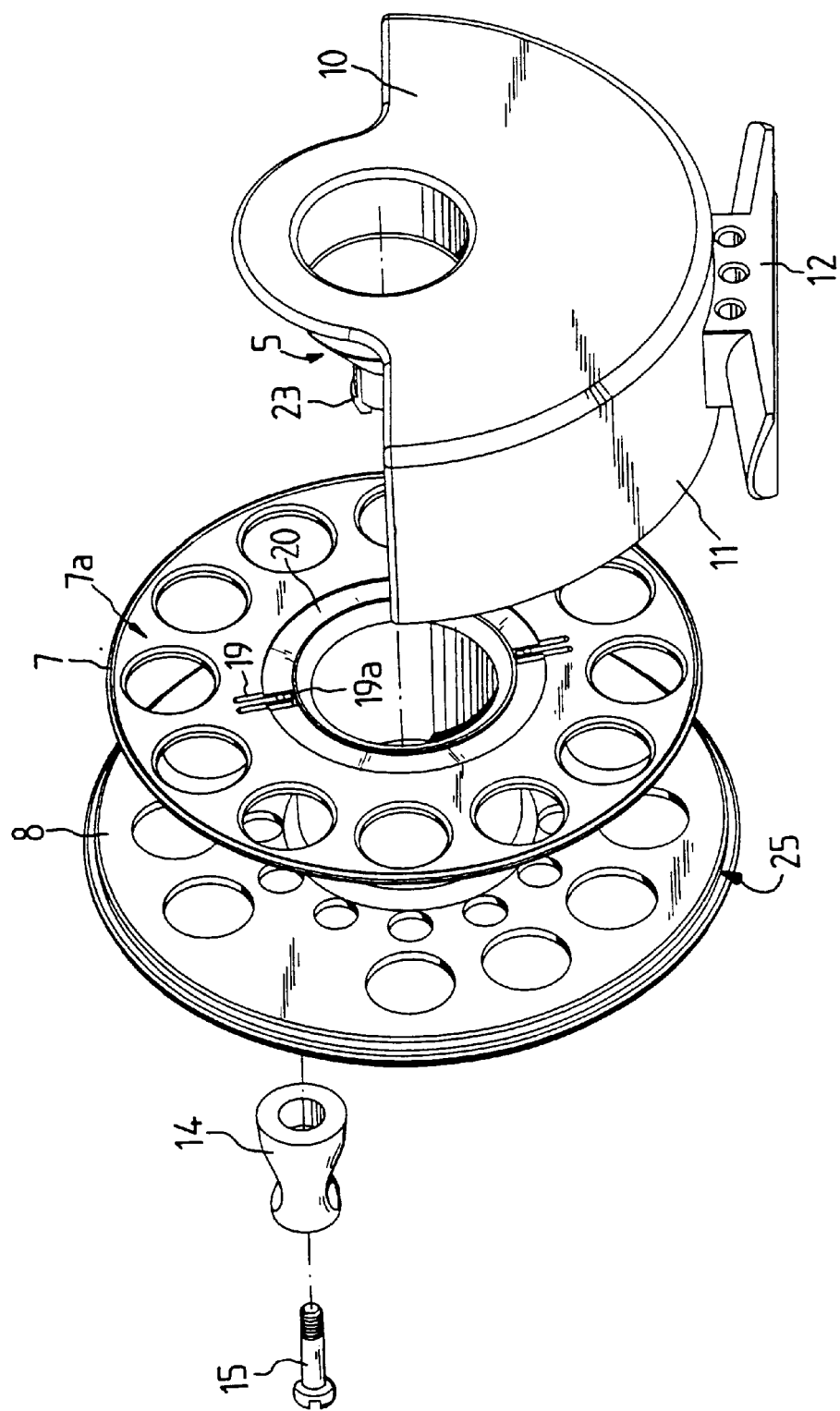

The reel 1 of the present invention is of particularly simple structure since it is made up of two main parts that are made of molded plastics material: namely a spool 2 for winding in fishing line; and a fixed support 3. In addition to these two main parts 2 and 3, the reel also includes a handle-forming device 4 enabling the spool 5 to be rotated on the axis of the fixed support 3.

The spool 2 is a part comprising a truncated cylinder 6 onto which the fishing line is wound, and two lateral cheekplates 7 and 8 extending perpendicularly to the axis of rotation of the truncated cylinder 6.

The fixed support 3 is a single piece comprising an upright 10, a piece 5 extending perpendicularly from the upright 10 and forming a rotary pivot for the spool 2, and a protection piece 11 which also extends perpendicularly from the upright 10. The protection piece 11 is provided with a fixing piece 12 for fixing the fixed support 3 to a fishing rod.

The handle-forming device 4 is made up of a handle proper 13 having an axial bore 14, a locking insert 16a, and a through screw 15. This device is secured to the outside face of cheekplate 8 of the spool 2 via a hollow cylindrical stud 16. The locking insert penetrates into the hollow portion of the stud 16 and expands to lock itself inside the stud 16 when the screw 15 that passes through the handle proper 13 is screwed into it.

In characteristic manner, the reel 11 of the invention includes a sound mechanism that is particularly simple since, in the version shown, it is made up of active elements that are integral firstly with the spool 2 and secondly with the fixed support 3. When these two pieces are molded, the elements of the sound mechanism are thus made during molding without any additional pieces being necessary.

More precisely, the sound mechanism is made up firstly of projecting studs 17 placed on the inside face 10a of the upright 10 of the fixed support 3 about the piece 5 forming the rotary pivot, and radially offset from the axis of rotation 18 proper. These studs 17 are preferably projections obtained during molding and they are in the form of rectangular blocks with sharp edges. The sound mechanism also comprises two blades 19 which are integrated in the spool 2 and disposed diametrically opposite each other beyond the truncated cylinder 6. When the spool is a molded piece, each blade 19 is made by means of a U-shaped cutout forming a recessed portion in the cheekplate 7 of the spool 2.

The outside face 7a of the cheekplate 7 has a recessed annular portion 20 to receive the studs 17. Each blade 19 has its free end 19a projecting into the recessed annular portion 20.

Thus, when the spool 2 is in position on the fixed support 3, the piece 5 forming the pivot penetrates into the truncated cylinder 6, the outside face 7a of the cheekplate 7 of the spool 2 bearing against the inside face 10a of the upright 10 of the fixed support 3. When this takes place, the studs 17 penetrate into the recessed annular portion 20. When the spool 2 is rotated by actuating the handle-forming device 4, the blades 19 which project into the recessed annular portion 20 strike against the studs 17. More precisely, each blade 19, on coming into contact with a given stud 17, is pushed away by the stud and then falls back because of its flexibility against the portion of the upright 10 which lies in the gap between two successive studs. It is this movement of the blade 19 against the stud 17 and against the upright 10 which provides the looked-for clicking noise.

An appropriate sound effect is obtained by having two diametrically opposite blades 19 and thirty-six studs 17 regularly distributed over 10° angular portions around the rotary pivot forming piece 5.

The leading edges of the blades 19 are preferably rounded so as to avoid the blades 19 striking the sharp edges of the studs 17 too roughly, since that could damage or even break the blades.

In the version in which the blades 19 are made by forming U-shaped cutouts in the cheekplate 7 during molding, it is desirable to establish protection on the inside face 7b of said cheekplate 7 in order to prevent the fishing line impeding the natural movements of the blades 19 as they pass over the studs 17. This protection can be achieved by providing ridges 20 on either side of each U-shaped cutout, the ridges being of substantially the same length as the blades 19 and being of a height that is greater than or equal to the displacement of the free ends of the blades as they pass over the studs 17. Thus, while fishing line is being wound onto the truncated cylinder 6, the line no longer bears against the inside face 7b of the cheekplate 7 in the vicinity of the blades 19, but follows a path that is deflected away therefrom by the ridges 20 which thus define respective inside spaces between said ridges 20 leaving room for blade movement.

In the example shown, the spool 2 is locked in position on the fixed support 3 by snap-fastening provided by the endpiece 21 of the pivot piece 5. This endpiece 21 has two end tongues 22 which are flexibly mounted relative to the pivot piece 5 and which include respective end catches 23. When the spool 2 is to be put into place on the fixed support 3, the pivot piece 5 is inserted into the hollow inside of the truncated cylinder 6 of the spool. The length of the pivot piece 5 is such that the catches 23 project from the truncated cylinder 6 beyond the cheekplate 8 which carries the handle-forming device 4. The diameter of the outlet orifice 24 is smaller than the diameter of the endpiece 21 so that the tongues are moved towards each other by elastic deformation as they pass through this orifice, and then return to their normal positions when their catches 23 move out from the cheekplate 8. It is the end catches that bear against the cheekplate 8, thereby locking the spool 2 on the fixed support 3. To release the spool 2 from the fixed support 3, it suffices to urge the two catches 23 towards each other while simultaneously pulling the cheekplate 8 away.

In the example shown, and as can be seen more particularly in FIG. 1, the pivot-forming piece 5 has two cylindrical portions of different diameters interconnected by a frusto-conical portion. The larger diameter of the piece 5 is close to the upright 10 of the fixed support 3, while its smaller diameter is near its endpiece 21. The presence of a large diameter portion serves to increase the mechanical strength of the assembly.

The protection piece 11 is advantageously curved in shape, forming a portion of a cylinder about the axis 18, with a diameter that is slightly greater than the diameter of the cheekplate 7. In addition, the width of the protection piece 11 is substantially equal to the width of the spool 2. Thus, when the spool 2 is put into place on the fixed support 3, the protection piece 11 partially closes the gap between the two cheekplates 7 and 8 of the spool 2. In a preferred embodiment, the peripheral edge 8a of cheekplate 8, and the peripheral edge 11a of the protection piece 11 have respective grooves 25 and 26 of complementary shape. When the spool 2 is in place on the fixed support 3, the groove 26 serves as a guide for the edge 8a of the cheekplate 8, and the edge 8a comes into line with the outside portion of the protection piece 11, thereby effectively closing said piece. To obtain this configuration, it is preferable to increase the thickness of the cheekplate 8, thereby imparting greater mechanical strength and greater stiffness to the spool in the portion thereof that serves to receive rotary drive from the handle-forming device 4.

In addition, because of the co-operation between the grooves 25 and 26, in the event of a force being inadvertently applied to the spool 2 transversely to its axis of rotation 9, the groove 25 of the cheekplate 8 bears against the groove 26 of the protection piece 11, thereby putting a limit on any possible relative displacement.

The present invention is not limited to the particular embodiment described above by way of nonlimiting example. In particular, the number, shape, and distribution of the studs, and the number of blades, can be varied to obtain the desired sound effect. Similarly, although it is particularly advantageous to make fishing reels from molded parts, the same sound mechanisms could be mounted on a reel made from parts that are not obtained by molding.

We claim:

1. A fishing reel comprising:
   a spool for winding in fishing line, said spool including first and second cheekplates, the first cheekplate having a recessed annular portion and at least one radially disposed blade projecting into the recessed annular portion; and
   a fixed support having a pivot around which said spool can rotate, said support including an upright which is in the immediate proximity of and parallel to the first cheekplate, the upright having studs positioned about the pivot and projecting into the recessed annular portion;
   wherein during rotation of the spool the at least one blade emits a characteristic clicking noise when it is raised by passing over one of the studs and falls back onto the upright of the fixed support.

2. A reel according to claim 1, having two diametrically opposite blades and thirty-six regularly distributed studs spaced at about 10° angular intervals.

3. A reel according to claim 1, wherein the studs are in the form of rectangular blocks having sharp edges, and the at least one blade has a rounded leading edge.

4. A reel according to claim 1, wherein ridges on an inside face of the first cheekplate are disposed on either side of a hollowed out portion formed by the at least one blade.

5. A reel according to claim 1, wherein the spool is molded out of plastics material and the at least one blade is formed by a cutout in the first cheekplate.

6. A reel according to claim 5, wherein the spool is made as a single molded piece and includes a handle-forming device fixed thereto to enable the spool to be rotated, and wherein the support is made as a single molded piece and includes a snap-fastening system for securing the pivot of the support to the spool.

7. A reel according to claim 6, wherein the spool includes a hollow cylindrical stud on an outside face of the second cheekplate and wherein the handle-forming device has a handle with a through bore, a through screw, and a locking insert suitable for being received in the cylindrical stud and for expanding when the screw is inserted and screwed therein.

8. A reel according to claim 1, wherein an inside face of the upright of the fixed support and an outside face of the first cheekplate of the spool are pressed against each other in a frictional manner when the spool rotates.

9. A fishing reel comprising:
   a spool including a cheekplate, the cheekplate having a recessed annular portion and at least one blade extending into the recessed annular portion; and
   a support having a pivot around which said spool can rotate, said support including an upright substantially parallel to the cheekplate, the upright having at least one stud extending into the recessed annular portion;
   wherein during rotation of the spool the at least one blade emits a characteristic clicking noise when it is pushed away by the at least one stud and falls back onto the upright.

10. The reel according to claim 9, further comprising a second blade diametrically opposed to the at least one blade.

11. The reel according to claim 9, wherein the at least one stud comprises thirty-six regularly distributed studs spaced at about 10° angular intervals.

12. The reel according to claim 9, wherein the at least one stud is in the form of a rectangular block having sharp edges.

13. The reel according to claim 9, wherein the at least one blade has a rounded leading edge.

14. The reel according to claim 9, wherein ridges on an inside face of the cheekplate extend on each side of a hollowed out portion formed by the at least one blade.

15. The reel according to claim 9, wherein the spool is molded out of a plastic material.

16. The reel according to claim 9, wherein the at least one blade is formed by a cutout in the cheekplate.

17. The reel according to claim 9, wherein the spool is made as a single molded piece.

18. The reel according to claim 9, wherein the support is made as a single molded piece.

19. The reel according to claim 9, wherein the support includes a snap-fastening system for securing the pivot of the support to the spool.

20. The reel according to claim 9, wherein an inside face of the upright of the support and an outside face of the cheekplate of the spool are pressed against each other in a frictional manner when the spool rotates.

* * * * *